United States Patent
Horikawa et al.

(10) Patent No.: US 10,468,667 B2
(45) Date of Patent: Nov. 5, 2019

(54) ELECTRODE SHEET FOR USE IN POWER STORAGE DEVICE AND POWER STORAGE DEVICE INCLUDING ELECTRODE SHEET

(71) Applicant: Sanyo Electric Co., Ltd., Daito-shi, Osaka (JP)

(72) Inventors: Akihiro Horikawa, Osaka (JP); Tomomichi Ueda, Osaka (JP); Masahiro Nakamura, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/772,599

(22) PCT Filed: Nov. 9, 2016

(86) PCT No.: PCT/JP2016/004838
§ 371 (c)(1),
(2) Date: May 1, 2018

(87) PCT Pub. No.: WO2017/085917
PCT Pub. Date: May 26, 2017

(65) Prior Publication Data
US 2019/0123338 A1    Apr. 25, 2019

(30) Foreign Application Priority Data

Nov. 20, 2015   (JP) .................................. 2015-228011

(51) Int. Cl.
*H01M 4/133*      (2010.01)
*H01M 4/583*      (2010.01)
(Continued)

(52) U.S. Cl.
CPC ............ *H01M 4/133* (2013.01); *H01G 9/008* (2013.01); *H01G 11/68* (2013.01); *H01M 4/02* (2013.01);
(Continued)

(58) Field of Classification Search
CPC ................ H01M 4/133; H01M 4/583; H01M 2004/028; H01M 10/05
See application file for complete search history.

(56) References Cited

U.S. PATENT DOCUMENTS

2010/0035157 A1    2/2010   Nakamura
2011/0217577 A1    9/2011   Fukui et al.

FOREIGN PATENT DOCUMENTS

JP    2003-68271 A     3/2003
JP    2008-159331 A    7/2008
(Continued)

OTHER PUBLICATIONS

International Search Report dated Dec. 27, 2016, issued in counterpart application No. PCT/JP2016/004838. (2 pages).

*Primary Examiner* — Osei K Amponsah
(74) *Attorney, Agent, or Firm* — Westerman, Hattori, Daniels & Adrian, LLP (57) ABSTRACT

A positive electrode active material layer is formed on at least one surface of a positive electrode current collector having a substantially rectangular planar shape. The positive electrode current collector includes an exposed portion in a partial region in a longitudinal direction and at an end portion of the partial region in a width direction, and a positive electrode lead is to be connected to the exposed portion. In a region in which the positive electrode active material layer is formed, an elastic modulus of a first region adjacent to the exposed portion in the width direction is larger than elastic moduli of second regions adjacent to the exposed portion and the first region in the longitudinal direction.

5 Claims, 7 Drawing Sheets (51) Int. Cl.
  *H01M 10/05* (2010.01)
  *H01G 9/008* (2006.01)
  *H01G 11/68* (2013.01)
  *H01M 4/02* (2006.01)
  *H01M 4/13* (2010.01)

(52) U.S. Cl.
  CPC ............ *H01M 4/13* (2013.01); *H01M 4/583* (2013.01); *H01M 10/05* (2013.01); *H01M 2004/028* (2013.01)

(56) References Cited

FOREIGN PATENT DOCUMENTS

| | | |
|---|---|---|
| JP | 2010-250994 A | 11/2010 |
| JP | 2011-204660 A | 10/2011 |
| JP | 2012-38530 A | 2/2012 |
| JP | 2013-196760 A | 9/2013 |
| JP | 2014-29852 A | 2/2014 |

ELECTRODE SHEET FOR USE IN POWER STORAGE DEVICE AND POWER STORAGE DEVICE INCLUDING ELECTRODE SHEET

TECHNICAL FIELD

The present disclosure relates to an electrode sheet for use in a power storage device, and the power storage device including the electrode sheet.

BACKGROUND ART

In recent years, as electronic devices rapidly become portable and cordless, the desire to increase the capacity of secondary batteries used as power sources for driving the electronic devices increases. Secondary batteries are increasingly used as storage batteries for vehicles and storage batteries for electric power storages. From the perspective of this, there is a need to increase the capacity of the secondary batteries.

Against such a background, for a non-aqueous electrolyte secondary battery in PTL 1, a positive electrode active material slurry is applied to a positive electrode current collector to form a positive electrode active material layer, and subsequently, a rectangular part of the positive electrode active material layer in a plan view is separated. A rectangular exposed portion at which there is no positive electrode active material is formed at a position at which the positive electrode active material layer is separated, and a positive electrode lead is welded to the exposed portion. The width of the exposed portion is less than the width of a positive electrode sheet. This enables the exposed portion to be formed within a portion of the positive electrode sheet in the width direction to increase the region of the positive electrode active material layer. Thus, a region in which charge and discharge reactions occur is increased to achieve an increased capacity.

CITATION LIST

Patent Literature

PTL 1: Japanese Published Unexamined Patent Application No. 2003-68271

SUMMARY OF INVENTION

Technical Problem

When an electrode sheet for use in a power storage device such as a battery is manufactured, an elongated current collector wound in a hoop shape is used. After an active material layer is formed on the elongated current collector, the elongated current collector is slit along the longitudinal direction to manufacture an electrode sheet material or electrode sheet materials in rows. The electrode sheet material on which the active material layer is formed is wound in a hoop shape. The hoop-like electrode sheet material is used in a process of manufacturing the power storage device such as a winding process. Since the elongated electrode sheet material wound in a hoop shape is used in the process of manufacturing the power storage device, the elongated electrode sheet material is preferably moved at a high speed to increase the productivity of the power storage device. When the electrode sheet material is moved at a high speed, it is necessary to apply a high tension to the electrode sheet material to prevent the electrode sheet material from wrinkling and meandering.

However, the present inventors have found that the high tension applied to the electrode sheet material on which the exposed portion is formed within the portion in the width direction as disclosed in PTL 1 arises the following problem. That is, a break is likely to occur from the boundary between the exposed portion and the positive electrode active material layer adjacent to the exposed portion in the longitudinal direction. The break in the electrode sheet material, which is caused when the electrode sheet material cannot withstand the high tension, increases the manufacturing cost of the electrode sheet for use in the power storage device due to disposal of a fault and a reduction in the productivity.

It is an object of the present disclosure to provide an electrode sheet for use in a power storage device and the power storage device including the electrode sheet that achieve an increase in the capacity and a reduction in the cost due to an improvement in the productivity.

Solution to Problem

An electrode sheet for use in a power storage device according to the present disclosure includes a current collector having a substantially rectangular planar shape, and an active material layer formed on at least one surface of the current collector. The current collector includes an exposed portion in a partial region in a longitudinal direction and at an end portion of the partial region in a width direction, and an electrode lead is to be connected to the exposed portion. In a region in which the active material layer is formed, an elastic modulus of a first region adjacent to the exposed portion in the width direction is larger than an elastic modulus of a second region adjacent to the exposed portion and the first region in the longitudinal direction.

Advantageous Effects of Invention

The electrode sheet for use in the power storage device and the power storage device according to the present disclosure achieve an increase in the capacity due to an increase in the amount of an active material that is filled and reduce the cost due to an improvement in the productivity.

BRIEF DESCRIPTION OF DRAWINGS

FIGS. 3(a) to 3c schematically illustrate an example of a method of manufacturing the positive electrode sheet according to the embodiment.

FIGS. 4(a) to 4(c) illustrate plan views of a part of an electrode sheet material in a comparative example 1 in time series until breaks occur after a high tension is applied. FIG.

4(a) is a plan view of the part of the electrode sheet material right before the tension is applied.

FIGS. 6(a) and 6(b) illustrate plan views of a part of each electrode sheet material for comparison between the comparative example 1 and the embodiment. FIG. 6(a) is a plan view of the part of the electrode sheet material in the comparative example 1.

An embodiment of the present disclosure (referred to below as the embodiment) will hereinafter be described in detail with reference to the drawings. In the description, specific shapes, materials, numeral values, and directions, for example, are examples for making the present disclosure easy to understand and can be appropriately changed in accordance with, for example, use, purpose, and specification. In the case where the description includes embodiments, modifications, and so on, it is assumed from the start that the features thereof are appropriately combined. The drawings referred in the description of each embodiment are schematically illustrated. In some cases, dimensional ratios of components illustrated in the drawings, for example, differ from actual ratios. The meaning of the term "substantially" in the description is such that, in the case where the phrase "substantially the entire region" is taken as an example, the meaning includes not only "the entire region" but also "substantially the entire region".

Figure 1:
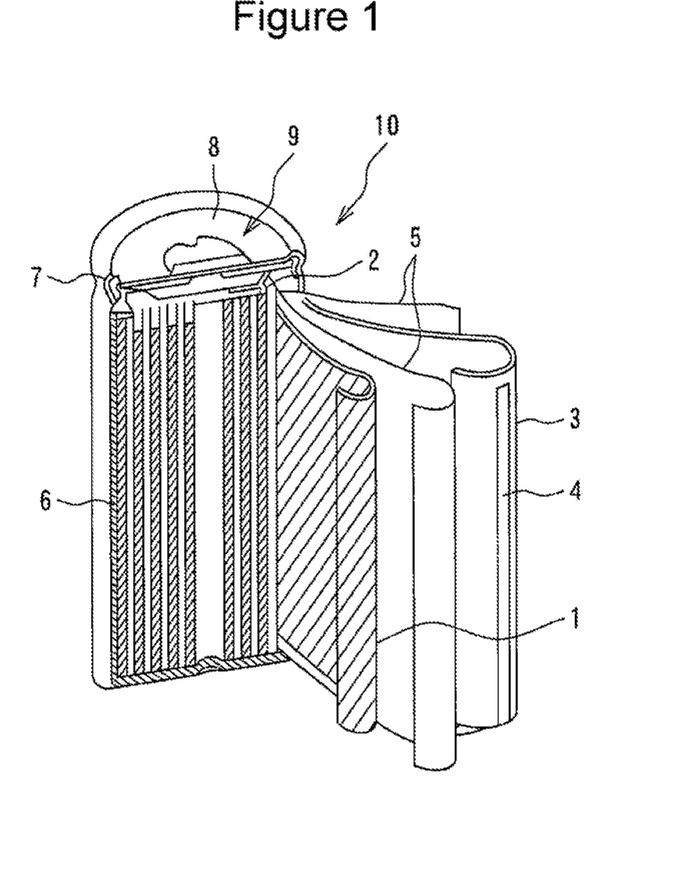
FIG. 1 illustrates the structure of a non-aqueous electrolyte secondary battery according to an embodiment.

FIG. 1 illustrates the structure of a non-aqueous electrolyte secondary battery according to an embodiment of the present disclosure. The non-aqueous electrolyte secondary battery is one of power storage devices.

A non-aqueous electrolyte secondary battery (referred to below as simply a battery) 10 includes a positive electrode sheet 1, a positive electrode lead 2, a negative electrode sheet 3, a negative electrode lead 4, a separator 5, a battery case 6, a gasket 7, a positive electrode lid 8, and a sealing plate 9. The positive electrode sheet 1 and the negative electrode sheet 3 are wound with the separator 5 interposed therebetween, and accommodated in the cylindrical battery case 6 together with an electrolytic solution. An opening of the battery case 6 is sealed by the sealing plate 9 with the gasket 7 interposed therebetween. The inside of the battery case 6 is sealed. The positive electrode lead 2 connects the positive electrode sheet 1 to the positive electrode lid 8 disposed on the sealing plate 9. The positive electrode lid 8 serves as a positive terminal of the battery. The negative electrode lead 4 connects the negative electrode sheet 3 to the battery case 6. The battery case 6 serves as a negative terminal of the battery.

The positive electrode sheet 1 is manufactured in the following manner. A conductive material, a binder, and so on are mixed with a positive electrode active material. The mixture is kneaded in a dispersion medium to form a paste of positive electrode active material slurry. Subsequently, the positive electrode active material slurry is applied to an elongated positive electrode current collector composed of a hoop-like material formed of metallic foil such as aluminum. Subsequently, the positive electrode active material slurry applied on the positive electrode current collector is dried and compressed to form a positive electrode active material layer on the positive electrode current collector. Finally, the positive electrode current collector on which the positive electrode active material layer is formed is cut with predetermined dimensions to manufacture the positive electrode sheet 1.

For example, a lithium nickel oxide serving as the positive electrode active material, acetylene black (referred to below as AB) serving as the conductive material, polyvinylidene fluoride (PVDF) serving as the binder, and N-methyl-2-pyrrolidone serving as the dispersion medium can be used for the positive electrode active material slurry.

The negative electrode sheet 3 is manufactured in the following manner. A conductive material, a binder, and so on are mixed with a negative electrode active material. The mixture is kneaded in a dispersion medium to form a paste of negative electrode active material slurry. Subsequently, the negative electrode active material slurry is applied to an elongated negative electrode current collector composed of a hoop-like material formed of metallic foil such as copper. Subsequently, the negative electrode active material slurry applied on the negative electrode current collector is dried and compressed to form a negative electrode active material layer on the negative electrode current collector. Finally, the negative electrode current collector on which the negative electrode active material layer is formed is cut with predetermined dimensions to manufacture the negative electrode sheet 3.

For example, graphite serving as the negative electrode active material, styrene-butadiene copolymer rubber particle dispersion (SBR) serving as the binder, carboxymethyl cellulose (CMC) serving as a thickener, and water serving as the dispersion medium are preferably used for the negative electrode active material slurry.

Figure 2A:
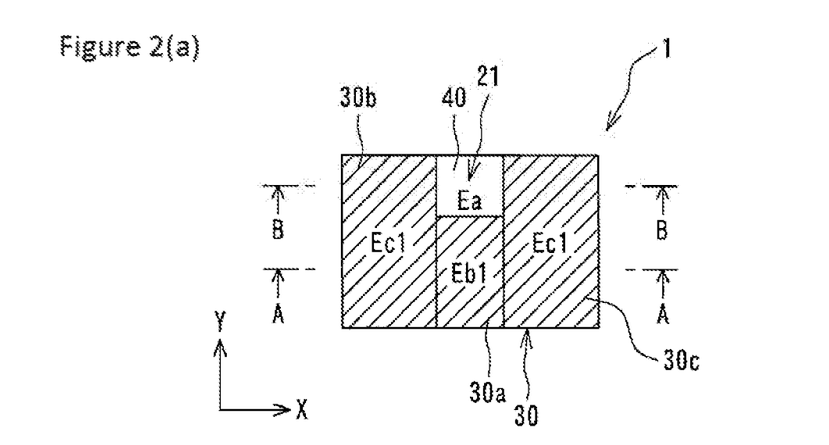
FIG. 2(a) is a plan view of a positive electrode sheet according to the embodiment.
Figure 2B:
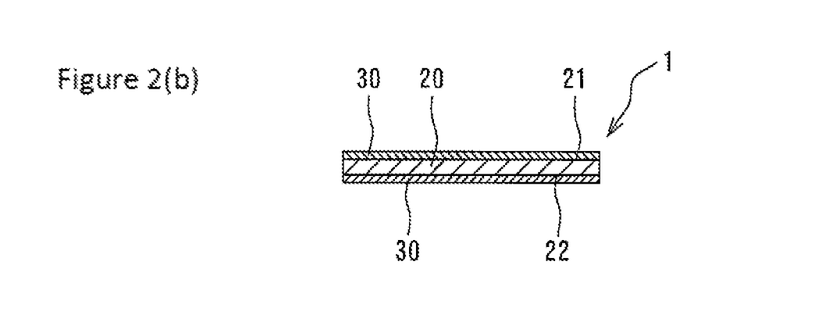
FIG. 2(b) is a sectional view of FIG. 2(a) taken along line A-A.
Figure 2C:
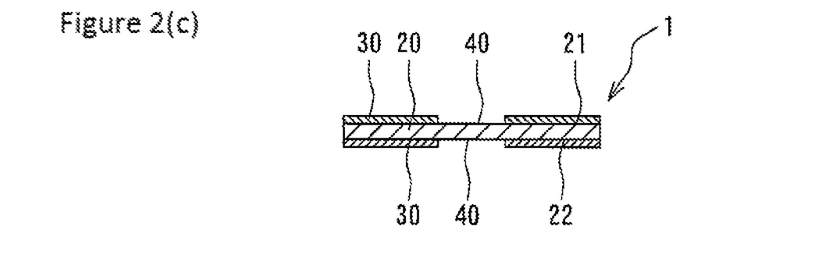
FIG. 2(c) is a sectional view of FIG. 2(a) taken along line B-B.
Figure 2D:
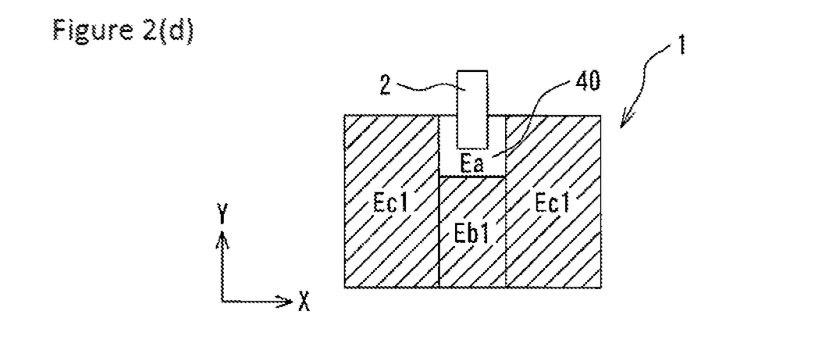
FIG. 2(d) is a plan view of the positive electrode sheet to which a positive electrode lead is connected.

FIG. 2(a) is a plan view of the positive electrode sheet 1. FIG. 2(b) is a sectional view of FIG. 2(a) taken along line A-A that does not traverse exposed portions 40. FIG. 2(c) is a sectional view of FIG. 2(a) taken along line B-B that traverses the exposed portions 40. FIG. 2(d) is a plan view of the positive electrode sheet 1 to which the positive electrode lead 2 is connected.

As illustrated in FIG. 2(a), the positive electrode sheet 1 has a substantially rectangular planar shape. As illustrated in FIG. 2(b), the positive electrode sheet 1 includes a positive electrode current collector 20 and positive electrode active material layers 30 formed on both surfaces of the positive electrode current collector 20. As illustrated in FIGS. 2(a) and 2(c), the positive electrode sheet 1 includes the exposed portions 40. The exposed portions 40 are located on a front surface 21 and a back surface 22 of the positive electrode current collector 20 in a central region in a longitudinal direction X and at an end portion of the central region in a width direction Y. In the case where the positive electrode active material layers 30 are formed on both surfaces of the positive electrode current collector 20, the positive electrode sheet 1 may include only one of the exposed portions 40 on a surface thereof. One of the positive electrode active material layers only may be formed on a surface of the positive electrode current collector 20.

As illustrated in FIG. 2(d), the positive electrode lead 2 is joined to one of the exposed portions 40 of the positive electrode sheet 1. The exposed portion 40 forms a lead connection to which the positive electrode lead 2 is connected. The negative electrode sheet 3 includes exposed portions at which no negative electrode active material slurry is applied. The negative electrode lead 4 is joined to one of the exposed portions of the negative electrode sheet 3. The exposed portion of the negative electrode sheet 3 forms a lead connection to which the negative electrode lead 4 is connected. Examples of a method of joining the positive electrode lead and the negative electrode lead include spot welding, ultrasonic welding, and crimping.

As illustrated in FIG. 2(a), each exposed portion 40 has a substantially rectangular shape in a plan view. The region in which each positive electrode active material layer 30 is formed is divided into a first region 30a and second regions 30b and 30c. According to the present disclosure, the first region 30a and the second regions 30b and 30c are defined as follows. The first region 30a is adjacent to the exposed portions 40 in the width direction Y. The first region 30a overlaps the exposed portions 40 when viewed in the width direction Y. The second regions 30b and 30c are adjacent to the exposed portions 40 and the first region 30a in the longitudinal direction X. The exposed portions 40 and the first region 30a are interposed between the second regions 30b and 30c.

The elastic modulus Eb1 of the first region 30a is larger than the elastic moduli Ec1 of the second regions 30b and 30c. The elastic moduli Ec1 of the second regions 30b and 30c are larger than the elastic moduli Ea of the exposed portions 40.

Figure 3A:
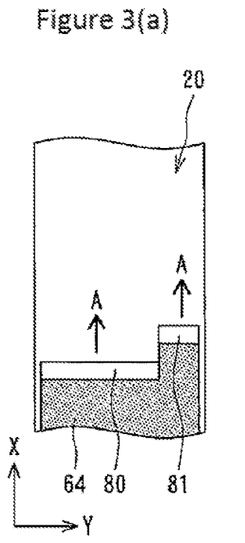
FIG. 3(a) and FIG. 3(b) schematically illustrate states where a positive electrode active material slurry is applied to an elongated positive electrode current collector that has not been cut with predetermined dimensions, and FIG. 3(c) schematically illustrates a state where the positive electrode active material slurry that has been dried is compressed with a roll.
Figure 3B:
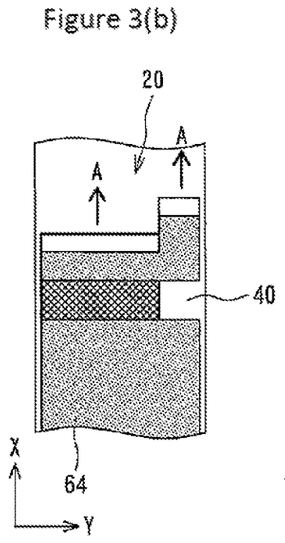
Figure 3C:
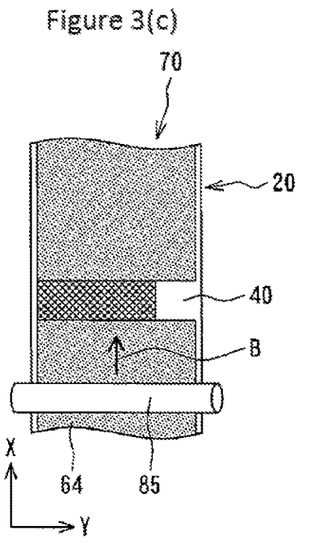

FIGS. 3(a) to 3(c) schematically illustrate an example of a method of manufacturing the positive electrode sheet 1. Specifically, FIG. 3(a) and FIG. 3(b) schematically illustrate states where a positive electrode active material slurry 64 is applied to the elongated positive electrode current collector 20 that has not been cut with predetermined dimensions. FIG. 3(c) schematically illustrates a state where the positive electrode active material slurry 64 that has been dried is compressed with a roll 85.

The positive electrode active material slurry 64 is applied to the positive electrode current collector 20 by using a first discharge nozzle including a discharge port 80 and a second discharge nozzle including a discharge port 81. As illustrated in FIG. 3(a), the discharge port 80 of the first discharge nozzle and the discharge port 81 of the second discharge nozzle face the positive electrode current collector 20. The discharge ports 80 and 81 are arranged so as not to be spaced apart from each other when viewed in the longitudinal direction X. When the positive electrode active material slurry 64 is applied, the discharge ports 80 and 81 are relatively moved in the direction of an arrow A with respect to the positive electrode current collector 20. At this time, the positive electrode active material slurry 64 is continuously discharged from the first discharge nozzle, and the positive electrode active material slurry 64 is intermittently discharged from the second discharge nozzle. Thus, each exposed portion 40 is formed. The amount of the positive electrode active material slurry 64 to be applied to the first region 30a is controlled so as to be larger than the amount of the positive electrode active material slurry 64 to be applied to the second regions 30b and 30c.

After the positive electrode active material slurry 64 is applied, the applied positive electrode active material slurry 64 is dried. Subsequently, as illustrated in FIG. 3(c), the roll 85 extending in the width direction Y of the positive electrode current collector 20 is relatively moved in the direction of an arrow B with respect to the positive electrode current collector 20 to form an electrode sheet material 70 including the positive electrode active material layer compressed with a predetermined thickness.

The above method forms each exposed portion 40 at an end portion of the electrode sheet material 70 in the width direction and enables the active material filling density of the first region 30a to be higher than the active material filling densities of the second regions 30b and 30c. An increase in the active material filling density of the first region 30a enables the elastic modulus Eb1 of the first region 30a to be larger than the elastic moduli Ec1 of the second regions.

Both edge portions of the compressed elongated electrode sheet material 70 in the width direction Y are slit along the longitudinal direction X to remove portions of the positive electrode current collector that are exposed. The elongated electrode sheet material 70 after being slit is cut along the central line passing through the middle between the exposed portions 40 adjacent to each other in the longitudinal direction X.

In a comparative example 1 and a comparative example 2, which will now be described, the elastic moduli of all regions in which the positive electrode active material layers are formed is uniform unlike the embodiment of the present disclosure. The comparative example 1 and comparative example 2 are compared with the embodiment of the present disclosure.

The comparative example 1 will be described with reference to FIG. 4(a). In the comparative example 1, the elastic modulus Eb2 [N/m$^2$] of a first region 130a of an electrode sheet material 170 is equal to the elastic modulus Ec2 [N/m$^2$] of each of second regions 130b and 130c thereof. Except for this, the electrode sheet material 170 in the comparative example 1 has the same structure as the electrode sheet material 70 according to the embodiment.

Figure 4A:
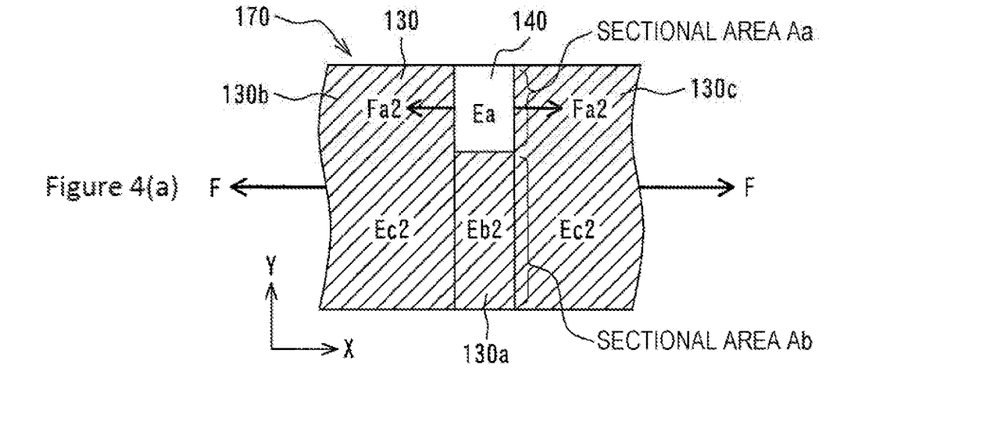
Figure 4B:
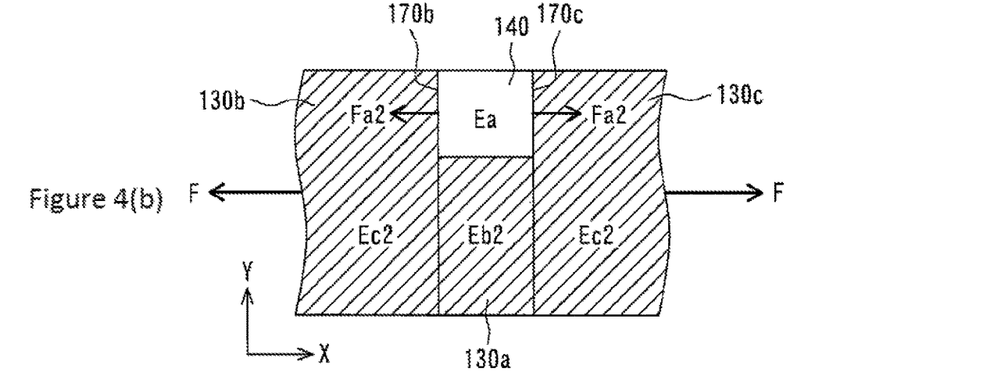
FIG. 4(b) is a plan view of a deformed part of the electrode sheet material.
Figure 4C:
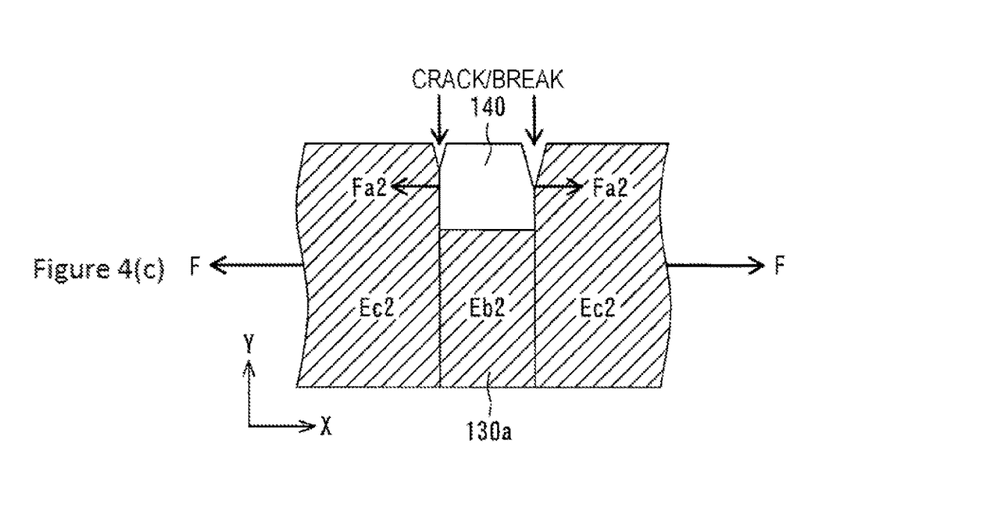
FIG. 4(c) is a plan view of a broken part of the electrode sheet material.

As illustrated in FIGS. 4(a) to 4(c) a force Fa2 [N] acts on the boundaries between exposed portions 140 and the second regions 130b and 130c of the electrode sheet material 170 to which a tensile force F [N] is applied. The exposed portions 140 and the first region 130a are elastic and are arranged in rows in relation to the longitudinal direction X. Accordingly, the following expression (1) is obtained.

$$Fa2=F\times[(Aa\times Ea)/(Ab\times Eb2+Aa\times Ea)] \qquad \text{expression (1)}$$

In the expression (1), Ea [N/m$^2$] is the elastic modulus of each exposed portion 140 and is equal to the elastic modulus of the positive electrode current collector 20. Ea is smaller than Eb2. The area of a section of the electrode sheet material 170 perpendicular to the longitudinal direction X is referred to as the sectional area of the electrode sheet material 170. In this case, Aa [m$^2$] represents the sectional area of the electrode sheet material 170 in each exposed portion 140, and Ab [m$^2$] represents the sectional area of the electrode sheet material 170 in the first region 130a.

When the tensile force F is applied in the longitudinal direction X, the electrode sheet material 170 is pulled in the longitudinal direction X, and the state thereof changes from a state illustrated in FIG. 4(a) into a state illustrated in FIG. 4(b). When the applied tension exceeds the breaking strength of the electrode sheet material 170, as illustrated in FIG. 4(c), breaks occur from the boundaries between the exposed portions 140 and the second regions 130b and 130c. When the electrode sheet material 170 is compressed, no pressure is applied to the inside of the exposed portions, but a pressure is applied to the boundaries. For this reason, there is a possibility that the breaking strength of the boundaries between the exposed portions 140 and the second regions 130b and 130c is lower than that of the inside of the exposed portions 140.

Figure 5:
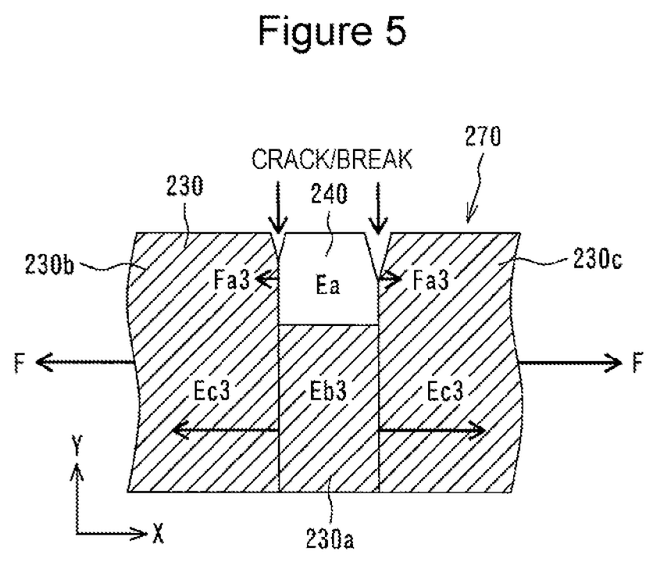
FIG. 5 is a plan view of a broken part of an electrode sheet material in a comparative example 2 as a result of a high tension being applied thereto.

The comparative example 2 will be described with reference to FIG. 5. An electrode sheet material 270 in the comparative example 2 has the same structure as in the comparative example 1 except that the active material densities of positive electrode active material layers 230 are higher than the active material densities of positive electrode active material layers 130 in the comparative example 1. That is, in the comparative example 2, the elastic modulus Eb3 of a first region 230*a* of the electrode sheet material 270 is equal to the elastic modulus Ec3 of each of second regions 230*b* and 230*c*, and these moduli are larger than the elastic moduli Eb2 and Ec2 in the comparative example 1. FIG. 5 schematically illustrates the electrode sheet material 270 in the comparative example 2 that is broken. Breaks illustrated in FIG. 5 occur when the electrode sheet material 270 is moved while a high tension is applied thereto as in the comparative example 1.

As illustrated in FIGS. 4(*a*), 4(*b*), 4(*c*) and FIG. 5, the elastic moduli of the first regions 130*a* and 230*a* in the comparative example 1 and the comparative example 2 are Eb2 and Eb3. When Eb2 in the right side of the expression (1) is replaced with Eb3, Fa2 in the left side is replaced with a force Fa3 that acts on the boundaries between exposed portions 240 and the second regions 230*b* and 230*c* in the comparative example 2. As described above, Eb2 and Eb3 satisfy a relational expression of Eb2<Eb3, and accordingly, Fa2>Fa3. Accordingly, the electrode sheet material is expected to be prevented from breaking in a manner in which the active material density of the entire positive electrode active material layer is increased. However, an increase in the active material density of the entire positive electrode active material layer does not necessarily prevent a break from occurring. In the comparative example 2, the positive electrode active material layer 230 is compressed under a pressure larger than that in the comparative example 1, and there is a possibility that the breaking strength of the boundaries between the exposed portions 240 and the second regions 230*b* and 230*c* is lower than that in the comparative example 1.

Figure 6A:
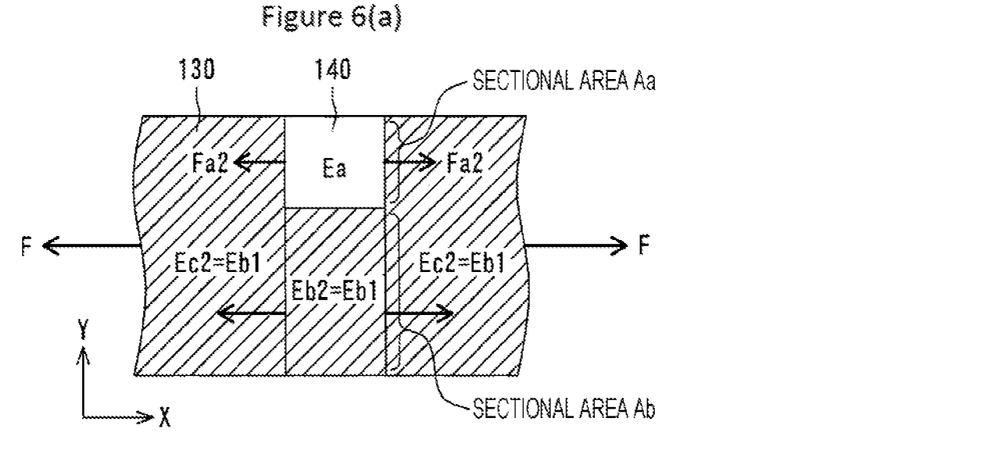
Figure 6B:
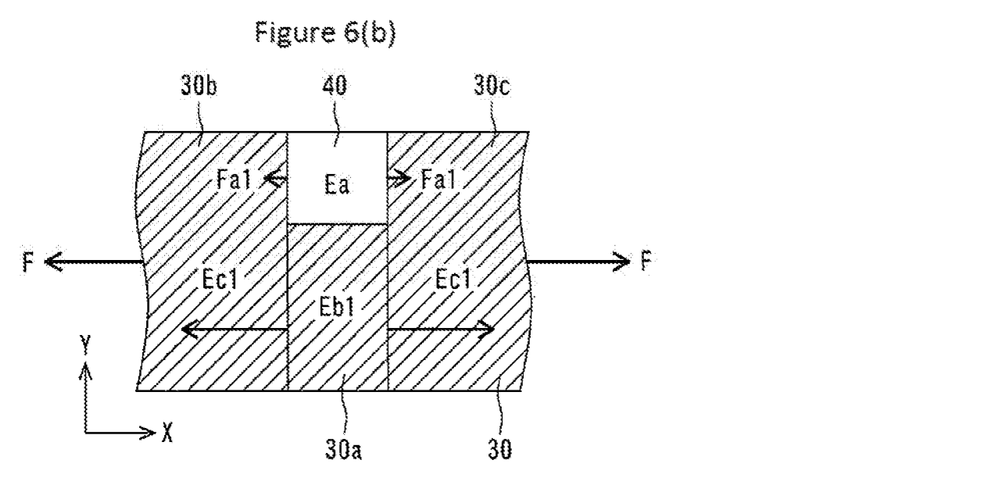
FIG. 6(b) is a plan view of the part of the electrode sheet material according to the embodiment.

FIGS. 6(*a*) and 6(*b*) illustrate plan views of a part of each electrode sheet material for illustrating the relation between the elastic moduli of the electrode sheet material in the comparative example 1 and the electrode sheet material according to the embodiment. According to the embodiment illustrated in FIG. 6(*b*), the active material filling density of the first region 30*a* adjacent to the exposed portions 40 in the width direction Y is higher than the active material filling densities of the second regions 30*b* and 30*c* as compared with the comparative example 1 illustrated in FIG. 6(*a*). The elastic modulus Eb1 of the first region 30*a* is thus higher than the elastic moduli Ec1 of the second regions 30*b* and 30*c*. When Eb2 in the right side of the expression (1) is replaced with Eb1 according to the embodiment, Fa2 in the left side is replaced with Fa1 according to the embodiment. Eb2 and Eb1 satisfy a relational expression of Eb2<Eb1, and accordingly, Fa2>Fa1 holds. That is, according to the embodiment, the elastic modulus Eb1 of the first region 30*a* is larger than the elastic moduli Ec1 of the second regions 30*b* and 30*c* that are the other regions in which each positive electrode active material layer is formed, and this decreases the force Fa1 that acts on the boundaries between the exposed portions 40 and the second regions 30*b* and 30*c*. Unlike the comparative example 2, it is only necessary to increase the active material density of the first region 30*a*, and there is no risk of a decrease in the mechanical strength of the boundaries between the exposed portions 40 and the second regions 30*b* and 30*c*.

The embodiment of the present disclosure will now be described in more detail with reference to a specific experimental example. The present invention is not limited to the experimental example described below, and modifications can be appropriately made without departing from the concept thereof.

EXPERIMENTAL EXAMPLE (Manufacture of Positive Electrode Active Material Slurry)

A lithium nickel composite oxide serving as the positive electrode active material, acetylene black (AB) serving as the conductive material, and polyvinylidene fluoride (PVDF) serving as the binder were mixed in a predetermined ratio. The mixture was kneaded in N-methylpyrrolidone (NMP) serving as the dispersion medium to manufacture the positive electrode active material slurry.

(Manufacture of Positive Electrode Sheet Material)

The positive electrode active material slurry thus manufactured was applied to both surfaces of the positive electrode current collector formed of aluminum foil and was dried by the method described according to the embodiment of the present disclosure. The dried positive electrode active material slurry was compressed with a predetermined thickness to form the positive electrode active material layers. Both edge portions of the positive electrode current collector in the width direction were slit to manufacture elongated positive electrode sheet materials. When the positive electrode active material slurry was applied to the first region adjacent to the exposed portions of each positive electrode sheet material in the width direction of the positive electrode current collector, the amount thereof was adjusted to manufacture positive electrode sheet materials having different active material densities of the first region in experimental examples 1 to 10. Each of the obtained elongated positive electrode sheet materials was wound in a hoop shape. Eb was the elastic modulus of the first region adjacent to the exposed portions of each positive electrode sheet material in the width direction of the positive electrode current collector. Ec was the elastic modulus of each second region, which was another region other than the first region, in which each positive electrode active material layer was formed. Table 1 illustrates the elastic modulus Eb of the first region in each of the experimental examples 1 to 10 by using an expression including the elastic modulus Ec of each second region. The specific value of the elastic modulus Ec was 30 kN/mm$^2$.

(Manufacture of Negative Electrode Active Material Slurry)

Synthetic graphite serving as the negative electrode active material, styrene-butadiene copolymer rubber (SBR) serving as the binder, and carboxymethyl cellulose (CMC) serving as the thickener were mixed in a predetermined ratio. The mixture was kneaded in water serving as the dispersion medium to manufacture the negative electrode active material slurry.

(Manufacture of Negative Electrode Sheet Material)

The negative electrode active material slurry thus manufactured was applied to both surfaces of the negative electrode current collector formed of copper foil and was dried. The method of application was conventional intermittent application, which enables each exposed portion to be formed at an end portion of the completed negative electrode sheet in the longitudinal direction. The dried negative electrode active material slurry was compressed with a predetermined thickness to form the negative electrode active material layers. Both edge portions of the negative electrode current collector in the width direction were slit to manufacture elongated negative electrode sheet materials. Each of the obtained elongated negative electrode sheet materials was wound in a hoop shape.

(Manufacture of Electrode Group)

The positive electrode sheet materials and the negative electrode sheet materials in the experimental examples 1 to 10 were paired with each other to manufacture electrode groups in the experimental examples 1 to 10 in the following manner. Each positive electrode sheet material, the corresponding negative electrode sheet material, and a separator formed of a polyethylene fine porous film were set in a winding device. With the winding device, an end portion of the positive electrode sheet material and an end portion of the negative electrode sheet material were pulled up to the position of a winding core, and the positive electrode sheet material and the negative electrode sheet material were wound with the separator interposed therebetween. The positive electrode sheet material and the negative electrode sheet material were cut after being wound, and an edge of the outermost circumference of each electrode group was secured with a tape to complete the electrode group. The positive electrode sheet material and the negative electrode sheet material were thus cut with the winding device to form the positive electrode sheet and the negative electrode sheet. When movement of the positive electrode sheet material and the negative electrode sheet material in the winding device was stopped, leads were joined to the exposed portions of the positive electrode sheet material and the negative electrode sheet material. The length of the positive electrode sheet in the width direction was 60 mm. The length thereof in the longitudinal direction was 1000 mm. The length of each exposed portion of the positive electrode sheet in the width direction was 5 mm. The length thereof in the longitudinal direction was 6 mm. The length of the negative electrode sheet in the width direction was 61 mm. The length thereof in the longitudinal direction was 1050 mm.

The non-aqueous electrolyte secondary battery described according to the embodiment of the present disclosure can be manufactured in a manner in which the corresponding electrode group thus manufactured is inserted into a cylindrical metallic exterior can with a bottom together with a non-aqueous electrolyte.

(Check of Presence or Absence of Break)

The electrode groups were manufactured under two different conditions when the positive electrode sheet material was moved during the manufacture of the electrode groups, and the conditions included the tension to be applied to the positive electrode sheet material and the speed of the movement of the positive electrode sheet material as follows.

Condition 1: a tension of 13 N, and a movement speed of 50 m/minute

Condition 2: a tension of 18 N, and a movement speed of 60 m/minute

The positive electrode sheet material was moved under the condition 1 to manufacture 2000 electrode groups in each of the experimental examples 1 to 10. The positive electrode sheet material was moved under the condition 2 to manufacture 2000 electrode groups in each of the experimental examples 1 to 10. The obtained electrode groups were dismantled to visually check the presence or absence of a break in each positive electrode sheet. The cases where no breaks were found under both the conditions 1 and 2 are represented by "◯". The case where breaks were found under both the conditions 1 and 2 are represented by "x". The cases where breaks were found only under the condition 2 are represented by "Δ". The table 1 illustrates the result.

TABLE 1

| | Elastic Modulus Eb | Result |
|---|---|---|
| Experimental Example 1 | Eb = Ec | X |
| Experimental Example 2 | Eb = 1.05 × Ec | Δ |
| Experimental Example 3 | Eb = 1.1 × Ec | ◯ |
| Experimental Example 4 | Eb = 1.5 × Ec | ◯ |
| Experimental Example 5 | Eb = 2 × Ec | ◯ |
| Experimental Example 6 | Eb = 3 × Ec | ◯ |
| Experimental Example 7 | Eb = 4 × Ec | ◯ |
| Experimental Example 8 | Eb = 5 × Ec | ◯ |
| Experimental Example 9 | Eb = 5.5 × Ec | ◯ |
| Experimental Example 10 | Eb = 6 × Ec | Δ |

In the experimental example 1, in which the elastic modulus Eb of the first region of each positive electrode active material layer was equal to the elastic modulus Ec of each second region, breaks in the positive electrode sheets were found under both the conditions 1 and 2. In the experimental example 1, the breaks occurred from the boundaries between the exposed portions and the second regions as illustrated in FIGS. 4(a) to 4(c). The result in Table 1 indicates that the positive electrode sheets are inhibited from breaking in a manner in which the elastic modulus Eb of the first region is increased to more than the elastic modulus Ec of each second region. The reason is presumably that an increase in the elastic modulus Eb of the first region decreases the force Fa that acts on the boundaries between the exposed portions and the second regions as described according to the embodiment of the present disclosure.

In the experimental example 2, breaks in the positive electrode sheets were found only when the positive electrode sheet material was moved under the condition 2. In the experimental example 2, the positive electrode sheets were inhibited from breaking unlike the experimental example 1, but the force Fa that acted on the boundaries between the exposed portions and the second regions was not sufficiently decreased because a difference between the elastic modulus Eb of the first region and the elastic modulus Ec of each second region was small. It can be understood from the result of the experimental examples 2 to 9 that the elastic modulus Eb of the first region is preferably equal to or more than 1.1 times the elastic modulus Ec of each second region.

Figure 7:
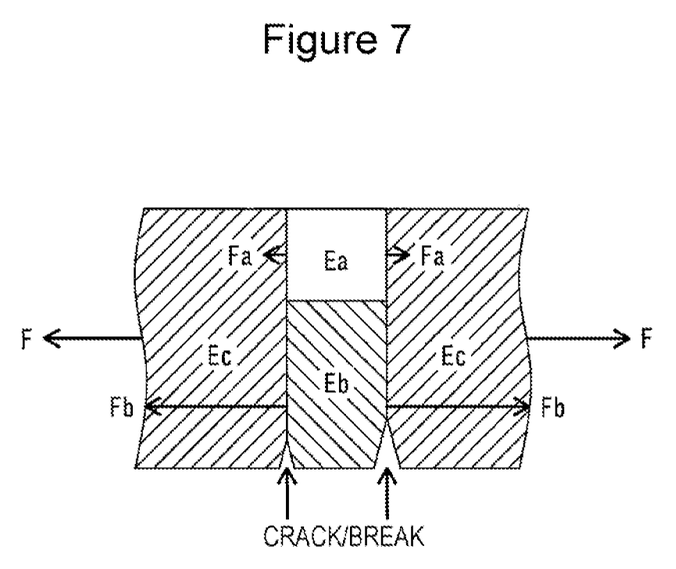
FIG. 7 is a plan view of a broken part of an electrode sheet material in an experimental example 10.

In the experimental example 10, breaks in the positive electrode sheets were found only when the positive electrode sheet material was moved under the condition 2 as in the experimental example 2. In the experimental example 10, the breaks in the positive electrode sheets occurred from the boundaries between the first region and the second regions as illustrated in FIG. 7. That is, when a difference between the elastic modulus Eb of the first region and the elastic modulus Ec of each second region is too large, a force Fb that acts on the boundaries between the first region and the second regions increases, and a break is likely to occur. It can be understood from the result of the experimental examples 3 to 10 that the elastic modulus Eb of the first region is preferably equal to or less than 5.5 times the elastic modulus Ec of each second region.

The above result is summarized as follows. The positive electrode sheets are inhibited from breaking in a manner in which the elastic modulus Eb of the first region is increased to more than the elastic modulus of each second region as in the experimental examples 2 to 10. In addition, the elastic modulus Eb of the first region and the elastic modulus Ec of each second region are more preferably satisfy a relational expression of 1.1× Ec≤Eb≤5.5× Ec. The experimental examples 2 to 10 are included in the embodiment of the present disclosure. That is, according to the embodiment of the present disclosure, the electrode sheet is inhibited from breaking, and the occurrence of a fault can be decreased. In addition, according to the embodiment of the present disclosure, the elongated electrode sheet that has not been cut can be moved at a high speed when a power storage device is manufactured, and the productivity of the power storage device can be increased. The decrease in the occurrence of a fault and the improvement in the productivity reduce the cost of the power storage device.

According to the embodiment of the present disclosure, the positive electrode sheet for use in the non-aqueous electrolyte secondary battery is described in detail as an example of the electrode sheet for use in the power storage device. However, examples of the power storage device according to the present disclosure include not only the non-aqueous electrolyte secondary battery but also other batteries such as a nickel-cadmium battery and a nickel-metal hydride battery. The examples of the power storage device also include capacitors other than batteries. For this reason, examples of the electrode sheet for use in the power storage device according to the present disclosure include positive electrode sheets and negative electrode sheets for use in batteries and capacitors. The material to be applied and the material of an object to which the material is applied are not limited to the materials described according to the embodiment.

INDUSTRIAL APPLICABILITY

According to the present disclosure, a power storage device having a high capacity can be provided at a low cost. The power storage device according to the present disclosure can be preferably used as main power sources of consumer mobile tools such as notebook personal computers and main power sources of large equipment such as electric vehicles (EVs).

REFERENCE SIGNS LIST

1 positive electrode sheet, 2 positive electrode lead, 3 negative electrode sheet, 5 separator, 10 non-aqueous electrolyte secondary battery, 20 positive electrode current collector, 21 front surface of the positive electrode current collector, 22 back surface of the positive electrode current collector, 30 positive electrode active material layer, 30a first region, 30b, 30c second region, 40 exposed portion, Eb1 elastic modulus of the first region, Ec1 elastic modulus of the second region

The invention claimed is:

1. An electrode sheet for use in a power storage device, comprising:
    a current collector having a substantially rectangular planar shape; and
    an active material layer formed on at least one surface of the current collector,
    wherein the current collector includes an exposed portion in a partial region in a longitudinal direction and at an end portion of the partial region in a width direction, and an electrode lead is to be connected to the exposed portion, and
    wherein, in a region in which the active material layer is formed, an elastic modulus of a first region adjacent to the exposed portion in the width direction is larger than an elastic modulus of a second region adjacent to the exposed portion and the first region in the longitudinal direction.

2. The electrode sheet for use in the power storage device according to claim 1,
    wherein $1.1 \times Ec \leq Eb \leq 5.5 \times Ec$ holds, where Eb [N/m$^2$] is the elastic modulus of the first region, and Ec [N/m$^2$] is the elastic modulus of the second region.

3. The electrode sheet for use in the power storage device according to claim 1,
    wherein a density of the active material layer formed in the first region is higher than a density of the active material layer formed in the second region.

4. A power storage device comprising:
    the electrode sheet for use in the power storage device according to claim 1.

5. The power storage device according to claim 4,
    wherein the electrode sheet for use in the power storage device is a positive electrode sheet, and
    wherein the power storage device further comprising:
    a negative electrode sheet containing a graphite active material; and
    a separator interposed between the positive electrode sheet and the negative electrode sheet.

* * * * *